No. 663,153. Patented Dec. 4, 1900.
M. BARR.
APPARATUS FOR DISPLAYING PHOTOGRAPHS.
(Application filed May 11, 1899.)
(No Model.) 2 Sheets—Sheet 1.
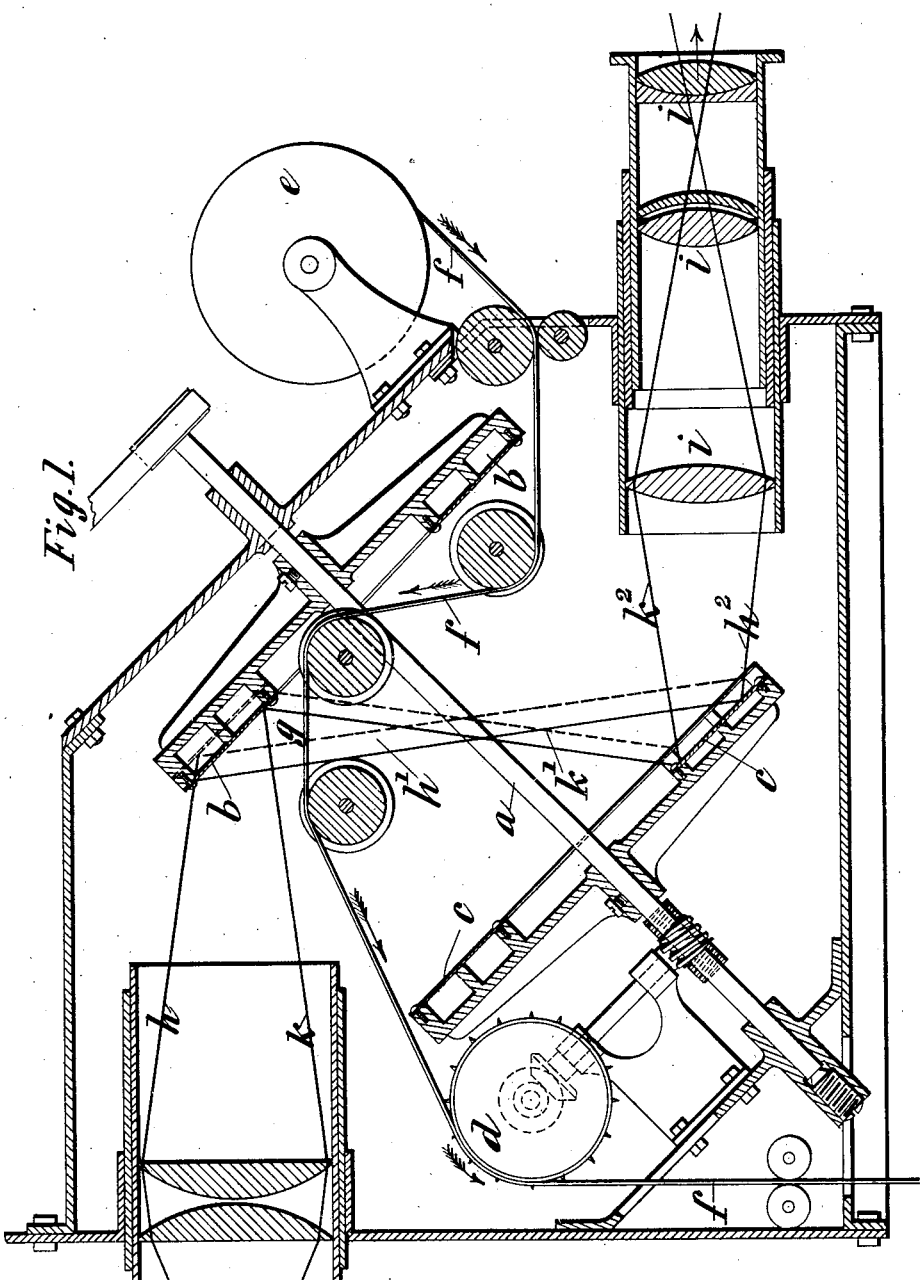
Witnesses
N. M. Corwin
G. B. Blemming
Inventor
Mark N. Barr
by Bakewell & Bakewell
his Attorneys No. 663,153. Patented Dec. 4, 1900.
M. BARR.
APPARATUS FOR DISPLAYING PHOTOGRAPHS.
(Application filed May 11, 1899.)
(No Model.) 2 Sheets—Sheet 2.
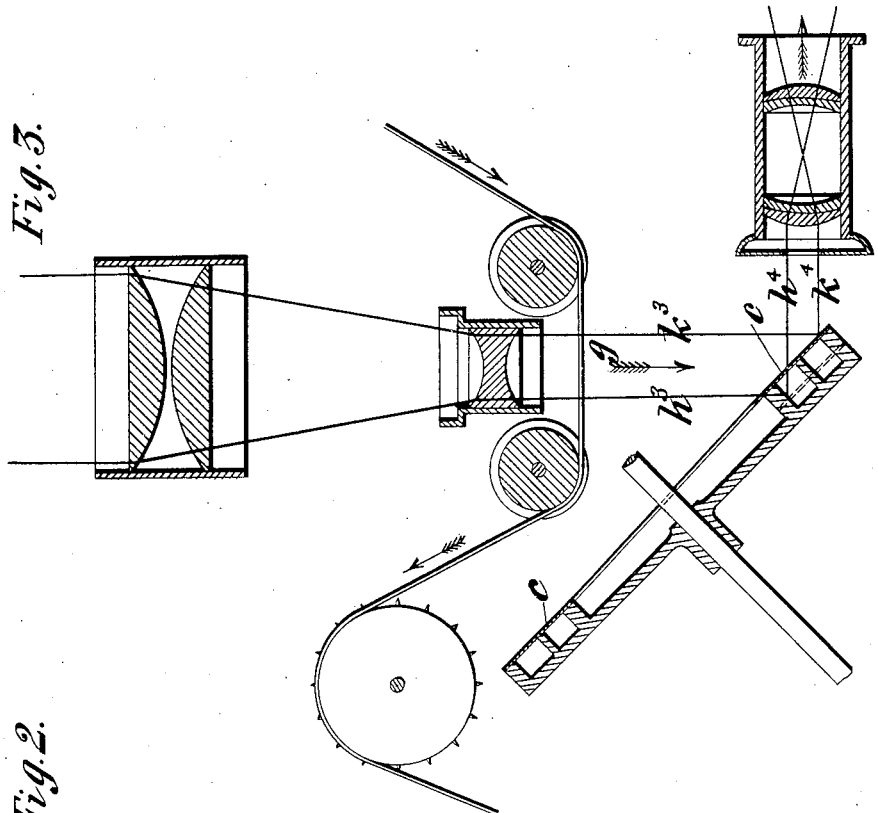
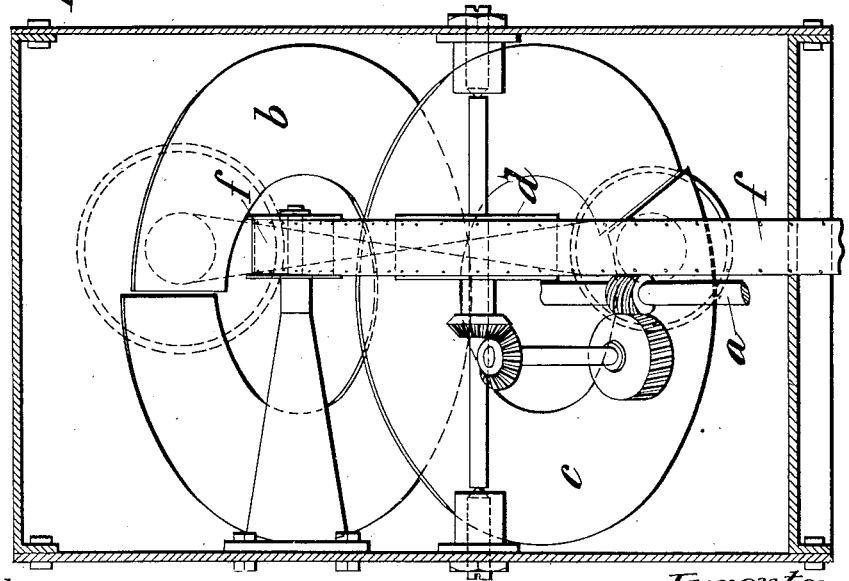
Witnesses
Inventor

UNITED STATES PATENT OFFICE.

MARK BARR, OF BOWDON, ENGLAND.

APPARATUS FOR DISPLAYING PHOTOGRAPHS.

SPECIFICATION forming part of Letters Patent No. 663,153, dated December 4, 1900.

Application filed May 11, 1899. Serial No. 716,395. (No model.)

*To all whom it may concern:*

Be it known that I, MARK BARR, a citizen of England, residing at "Rosbrin," Bowdon, in the county of Chester, England, have invented certain new and useful Improvements in Apparatus for Displaying Photographs, of which the following is a specification.

Apparatus hitherto employed for displaying photographs of moving objects have acted intermittently—that is to say, the film on which the positives have been printed moves the length of a picture, then rests for a short time, and so on alternately. This intermittent action, recurring every small fraction of a second, involves considerable mechanical difficulties and certain optical imperfections.

My invention relates to apparatus in which the movement of the film for displaying successive views of moving objects is uniform and continuous, no parts of the apparatus having reciprocating or intermittent action.

I shall describe apparatus according to my invention, referring to the accompanying drawings.

Figure 1 is a vertical section of the apparatus and Fig. 2 is a front view of the interior, the front of the casing being supposed to be removed. Fig. 3 is a vertical section of a modification.

Referring first to Figs. 1 and 2, an axis $a$, caused to revolve rapidly, say ten to twenty times per second by any convenient motor—such, for instance, as an electric motor—has fixed on it two equal and similar annular mirrors $b$ and $c$, their reflecting-faces being helical—that is to say, they gradually and uniformly slope from a point of the circumference where the face is highest down to the same point where it is lowest—the pitch or difference between the greatest and least height being suited, as will be presently described, to the length of film occupied by each picture. From the axis $a$, by worm or other suitable gear, is driven a pegged wheel $d$, which as it revolves draws the film $f$ from a reel $e$ and over suitable guide-pulleys, so that it moves continuously, always presenting a portion of its length in the beam of light $g$. A beam of converging rays (obtained from any convenient source) included between the lines $h\ k$ as it is reflected from the mirror $b$ is caused by the rotation of the helical surface of that mirror to travel across the opening $g$ to a position indicated by the dotted lines $h'\ k'$, and the pitch of the helical surface and the speed of travel of the film having in the first place been determined in proper relation to each other the reflected beam $h'\ k'$ travels along with the image on the film through the opening $g$ and also travels along the reflecting-face of the second mirror $c$. This mirror having its face directed opposite to the face of $b$ would cause a beam reflected from it to travel in the direction opposite to that in which the beam $h'\ k'$ travels, and therefore this beam is reflected from $c$, as indicated by $h^2\ k^2$ without any travel at all. Consequently the beam $h^2\ k^2$, carrying the image from the film when directed through suitable lenses $i$, throws a stationary image upon the screen.

According to the modification shown in Fig. 3 the beam $h^3\ k^3$ is assumed to consist of parallel rays passing directly through the film at $g$, where every different point of the traveling image receives a different ray, and therefore the effect would be the movement of the image on a screen but for the action of the mirror $c$, which corrects the movement of the rays, reflecting the beam $h^4\ k^4$, so as to throw a stationary image on the screen.

Having now particularly described and ascertained the nature of this invention and the best means I know for carrying the same into practical effect, I claim—

1. Apparatus for displaying photographs from a traveling film comprising means of causing the film to travel uniformly, suitable projecting lenses, two revolving mirrors having helical surfaces, the one arranged to reflect rays from a source of light onto the film, these rays being caused by the continuous change of position of the reflecting-surface to travel with and through the film; the other mirror arranged to receive the rays passed through the film and by the continuous change of position of its reflecting-surface to cause these traveling rays when reflected to pass through the projecting lenses and form a stationary image on a screen, and mechanism for revolving the mirror, substantially as described.

2. Apparatus for displaying photographs from a traveling film comprising means for causing the film to travel uniformly, projecting lenses, a revolving mirror having a helical surface arranged to reflect rays passed through the traveling film, which would otherwise seem to travel along a screen, by the change of position of the reflecting-surface to pass through the projecting lens so as to render the image on the screen stationary, and mechanism for revolving the mirror, substantially as described.

3. Apparatus for displaying photographs, comprising a film, mechanism for causing the film to travel uniformly, a projecting lens, a revolving mirror having a helical surface arranged to reflect rays passed through the traveling film, and mechanism for revolving the mirror; substantially as described.

In testimony whereof I have hereunto set my hand in presence of two subscribing witnesses.

MARK BARR.

Witnesses:
GEO. WM. FOX, Jr.,
WILLIAM H. BURLING.